United States Patent
Kiefer et al.

(10) Patent No.: US 11,124,905 B2
(45) Date of Patent: Sep. 21, 2021

(54) PROCESS FOR MANUFACTURING MINERAL WOOL

(71) Applicant: SAINT-GOBAIN ISOVER, Courbevoie (FR)

(72) Inventors: Lionel Kiefer, Binges (FR); Joel Azevedo, Gif sur Yvette (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 286 days.

(21) Appl. No.: 16/325,900

(22) PCT Filed: May 3, 2017

(86) PCT No.: PCT/FR2017/051059
§ 371 (c)(1),
(2) Date: Feb. 15, 2019

(87) PCT Pub. No.: WO2018/042085
PCT Pub. Date: Mar. 8, 2018

(65) Prior Publication Data
US 2019/0211484 A1   Jul. 11, 2019

(30) Foreign Application Priority Data
Sep. 2, 2016 (FR) ...................... 1658166

(51) Int. Cl.
*D04H 1/4218* (2012.01)
*C03C 25/321* (2018.01)
*D04H 1/587* (2012.01)
*D04H 1/64* (2012.01)
*C03C 25/32* (2018.01)

(52) U.S. Cl.
CPC ........... *D04H 1/4218* (2013.01); *C03C 25/32* (2013.01); *C03C 25/321* (2013.01); *D04H 1/587* (2013.01); *D04H 1/64* (2013.01)

(58) Field of Classification Search
USPC .................. 442/180, 176; 106/162.5, 212.1; 428/34.5, 292.1
See application file for complete search history.

(56) References Cited

U.S. PATENT DOCUMENTS

| | | |
|---|---|---|
| 2011/0223364 A1 | 9/2011 | Hawkins et al. |
| 2014/0364029 A1 | 12/2014 | Hawkins et al. |
| 2017/0029669 A1* | 2/2017 | Obert .................... C03C 25/321 |
| 2017/0198425 A1 | 7/2017 | Obert et al. |

FOREIGN PATENT DOCUMENTS

| | | |
|---|---|---|
| WO | WO 2012/118939 A1 | 9/2012 |
| WO | WO 2015/132518 A1 | 9/2015 |
| WO | WO 2015/181458 A1 | 12/2015 |

OTHER PUBLICATIONS

International Search Report dated Jul. 28, 2017 in PCT/FR2017/051059 filed on May 3, 2017.

* cited by examiner

*Primary Examiner* — Lynda Salvatore
(74) *Attorney, Agent, or Firm* — Element IP, PLC

(57) ABSTRACT

A process for manufacturing insulating products based on mineral wool includes applying, on mineral wool fibers, a binding composition containing (a) at least one carbohydrate selected from reducing sugars, non-reducing sugars, hydrogenated sugars, and a mixture thereof, and (b) at least one crosslinking agent for crosslinking the carbohydrate(s). The process also includes evaporating the solvent phase of the binding composition and thermal curing the non-volatile fraction of the composition. Further, added to the binding composition, preferably immediately before the application thereof on the mineral wool fibers, is an oil-in-water emulsion including water, a mineral oil, at least one nonionic surfactant and a water-soluble polysaccharide. The mean diameter of the oil droplets of the stable oil-in-water emulsion, determined by laser diffraction particle size analysis, is greater than 5 μm.

20 Claims, No Drawings

PROCESS FOR MANUFACTURING MINERAL WOOL

The present application relates to a process for manufacturing thermal insulation products based on mineral wool using anti-dusting agents of oil-in-water emulsion type.

The manufacture of insulation products based on mineral wool generally comprises a step of manufacturing glass fibers or rock fibers via a centrifugation process. On their journey between the centrifugation device and the fiber collection belt, an aqueous binding composition, also referred to as binder, is sprayed onto the fibers while they are still hot, and the composition then undergoes a thermosetting reaction at temperatures of around 200° C.

The phenolic resins that have been used for several decades as binders are increasingly being replaced with products derived from renewable sources and which emit very little or no formaldehyde, which is a compound considered to be potentially harmful to human health.

It is thus known practice, for example from U.S. Pat. No. 8,197,587 and US 2011/0223364, to bind mineral fibers with formaldehyde-free aqueous binding compositions containing, as thermally crosslinkable reagents, carbohydrates and polycarboxylic acids.

Furthermore, it is known to incorporate, into an aqueous binding composition for mineral fibers, an agent for reducing dust. The anti-dusting agent most commonly used is a mineral oil. In order to guarantee a homogeneous mixing of the mineral oil with the aqueous binding composition and an amount of anti-dusting agent applied that is stable over time, it has been proposed to package the mineral oil in the form of an oil-in-water emulsion stabilized by surfactants and/or thickeners of the aqueous phase.

Emulsions that are as fine and as stable as possible are generally sought. The present invention is based on the discovery that the great stability and fineness of the oil-in-water emulsions used to date could limit the effectiveness of the anti-dusting agents.

Specifically, it is generally assumed that the fraction of mineral oil effective for retaining the dust is the fraction spread on the surface of the binder layer (i.e. at the binder/air interface) cured at the end of the curing step. The mineral oil must therefore be separated—during the step of application on the fibers or immediately afterwards—from the other ingredients of the binding composition in order to form a surface layer coating the binder layer. Specifically, mineral oil droplets trapped in the cured binder would be ineffective for retaining the dust particles.

The technical problem behind the present invention therefore results from a two-fold constraint, namely from the need to provide an oil-in-water emulsion of anti-dusting agent that is stable until the time the binding composition is applied, and from the need, when spraying the binding composition, to rapidly is destabilize the emulsion in order to form a layer of oil on the surface of the binder layer.

The applicant, in the context of its research studies targeted at optimizing the anti-dusting emulsions for mineral wool bound by bio-based binders, has discovered that an important parameter to be taken into consideration was the size of the oil droplets. Emulsions containing relatively large droplets, having a size of the order of from several microns to several tens of microns, were more effective than finer emulsions with droplets of the order of a micron or submicronic droplets.

Without wishing to be bound by any one theory, the inventors believe that this effect is due to an accelerated destabilization of the emulsion. In the mineral wool manufacturing process, the kinetic aspects are specifically important: the anti-dusting emulsion, preferably stable during storage, is injected into the line that feeds the gluing ring with the aqueous binding composition. Several seconds later, the binding composition/anti-dusting emulsion mixture is dispersed in the air by spray nozzles and comes into contact with mineral fibers that are still hot. The viscosity of the binding composition applied increases very quickly following the evaporation of the aqueous phase and the binder is permanently cured by heating in the drying oven several tens of seconds later. It is therefore in the very first seconds after the application on the fibers that the anti-dusting mineral oil droplets must coalesce and form a film on the surface of the binder layer. If the oil droplets are too small, the destabilization of the emulsion is too slow and too large a fraction of oil risks remaining trapped in the form of fine droplets in the bulk of the cured binder.

The oil-in-water emulsions used in the present invention are therefore more effective than those from the prior art because they contain larger oil droplets which coalesce more easily and migrate more rapidly to the binder/air interface. The facilitated rupture of the emulsion accelerates the migration of the oil to the binder/air interface and reduces, or even eliminates, the amount of oil trapped in the bulk of the cured binder. The result of this is an increase in the anti-dusting effectiveness.

The present invention therefore relates to a process for manufacturing insulating products based on mineral wool, comprising the application, on mineral wool fibers, of a binding composition containing
  (a) at least one carbohydrate selected from reducing sugars, non-reducing sugars, hydrogenated sugars and a mixture thereof,
  (b) at least one crosslinking agent for crosslinking the carbohydrate(s),
the evaporation of the solvent phase of the binding composition and
the thermal curing of the non-volatile fraction of the composition, said process being characterized in that, added to the binding composition, preferably immediately before the application thereof on the mineral wool fibers, is a, preferably stable, oil-in-water emulsion comprising water, a mineral oil, at least one nonionic surfactant and a water-soluble polysaccharide, the mean diameter of the oil droplets of the oil-in-water emulsion, determined by laser diffraction particle size analysis, being greater than 5 µm.

The expression "crosslinking agent for crosslinking carbohydrates" is understood in the present application to mean a compound capable of reacting, optionally in the presence of a catalyst, with the carbohydrates and of forming with the latter a three-dimensional network that is at least partially insoluble.

The process according to the invention therefore comprises the following four steps:
(1) mixing the binding composition with the oil-in-water emulsion, referred to hereinafter as anti-dusting emulsion,
(2) applying the mixture obtained to the mineral wool fibers, preferably by spraying (dispersion of the binding composition in the air),
(3) evaporating the volatile phase of the mixture of the binding composition and of the anti-dusting emulsion, and
(4) thermal curing of the nonvolatile fraction at high temperature, generally at least equal to 200° C.

The oil-in-water emulsion used in the present invention is preferably a stable emulsion. This means that it may be stored, in the absence of stirring, for several weeks at a temperature between 20° C. and 50° C. without the mean diameter of the oil droplets that it contains increasing significantly.

The oil content of the anti-dusting emulsions of the present invention is advantageously between 30% and 70% by weight, preferably between 40% and 65% by weight and in particular between 45% and 60% by weight.

The anti-dusting emulsions used in the present invention contain, as anti-dusting agent, mineral oil also referred to as liquid paraffin. It advantageously has a kinematic viscosity at 20° C. between 100 and 6000 mm$^2$/s.

The applicant has obtained particularly advantageous results with a "high-viscosity" mineral oil having a kinematic viscosity at 20° C. (ISO 3104) between 1000 and 5000 mm$^2$/s. This kinematic viscosity range of the mineral oil is consequently particularly preferred.

Mineral oils are available on the market for example under the names Novadex C304 or Catenex S579 (high-viscosity oil) or Novadex B110 (low-viscosity oil).

The oil-in-water anti-dusting emulsion is stabilized by a combination of two components, namely:
 a nonionic surfactant or a mixture of nonionic surfactants, and
 a thickening polymer for thickening the aqueous phase.

Use may in principle be made of any nonionic surfactant known for its emulsifying properties. It generally has an HLB (Hydrophilic Lipophilic Balance) of greater than 10.

As examples of nonionic surfactants that can be used for the present invention, mention may be made of:
 esters of fatty acids, in particular polyalkoxylated derivatives of fatty acids,
 ethers of fatty alcohols, in particular polyalkoxylated derivatives of fatty alcohols,
 polyalkoxylated derivatives of polyols such as polyalkoxylated derivatives of glycerol or of trimethylolpropane,
 block copolymers of poly(ethylene oxide) and of poly(propylene oxide), in particular poloxamers which are triblock copolymers comprising a central poly(propylene oxide) block and two poly(ethylene oxide) blocks.

The total amount of nonionic surfactant(s) is advantageously between 0.5 and 5 parts by weight, preferably between 1.2 and 3 parts by weight and in particular between 1.5 and 2.8 parts by weight per 100 parts by weight of mineral oil.

The thickening polymers for thickening the aqueous phase are known. They are polysaccharides that are soluble in water at ambient temperature. As examples of such polysaccharides, mention may be made of derivatives of cellulose, in particular hydrophilic cellulose ethers such as hydroxyalkyl celluloses and carboxyalkyl celluloses, maltodextrins, natural gums such as xanthan gum, guar gum and scleroglucans. It is of course possible to use a combination of these thickeners.

When expressed relative to the amount of mineral oil, the amount of water-soluble polysaccharide is between 0.1 and 2 parts by weight, preferably between 0.5 and 1 part by weight per 100 parts by weight of mineral oil.

In order to prepare the oil-in-water emulsion of the present invention, an aqueous solution of the surfactant, or of the surfactants, and of the thickening polymer for thickening the aqueous phase is advantageously prepared first. The dissolving of these two water-soluble components may require a moderate heating of the aqueous phase, for example at a temperature between 30 and 80° C., and a relatively long stirring time between around 1 hour and 20 hours. It is however preferable that after returning to ambient temperature the two components remain soluble in the water.

Next the mineral oil is added to the aqueous phase containing the surfactant and the water-soluble polysaccharide in the dissolved state. The mixture is then subjected to shear stresses or to ultrasonic waves until a stable emulsion is obtained.

The applicant used, for obtaining oil-in-water emulsions having droplets with a mean size of greater than 5 μm, an Ultra-Turrax IKA T50 disperser with an S50N-G45G dispersing tool, the disperser operating at the maximum speed (10 000 rpm) for around 1 to 5 min.

The size of the droplets may be adjusted by modifying either the shear stress used (i.e. the shear rate of the disperser) or the viscosity of the mineral oil used:
 for a given mineral oil, the higher the shear stress, the smaller the droplets; when it is desired to increase their diameter it is necessary to reduce the speed of rotation of the dispersing tool,
 for a given shear stress, the more viscous the oil, the larger the diameter of the droplets; when it is desired to reduce the diameter it is therefore advisable to choose a less viscous oil.

The amount of nonionic surfactants and/or thickening agent has little influence on the diameter of the droplets but does have an influence on the stability of the emulsions obtained.

The volume mean diameter of the oil droplets of the emulsion obtained is then determined by laser particle size analysis using a laser diffraction particle size analyzer (Metasizer 2000 or Metasizer 3000) at a temperature of 20° C. For this, the emulsion must be diluted in a large volume of water (dilution of around 1/1000 to 1/100,000). The value of the mean diameter is however independent of the dilution performed.

As already explained in the introduction, the applicant observed that, for a given amount of oil applied, the oil-in-water emulsions of the present invention having a particle size distribution with a mean diameter of greater than 5 μm had a better anti-dusting effectiveness than emulsions from the prior art containing droplets of smaller size.

This mean diameter is advantageously between 5.1 and 150 μm, preferably between 6.0 and 100 μm, more preferentially between 6.5 and 60 μm, more preferentially still between 7 and 40 μm, preferably between 8 and 35 μm, in particular between 10 and 30 μm.

The binding composition based on carbohydrates and on crosslinking agent, preferably polycarboxylic acids, used in the present invention is known and described for example in U.S. Pat. No. 8,197,587, WO2010/029266, WO2013/014399, WO2015/181458, WO2012/168619, WO2012/168621, WO2012/072938.

In the present application, the term "carbohydrates" has a broader meaning than usual, since it encompasses not only carbohydrates in the strict sense, i.e. reducing sugars or carbohydrates of formula $C_n(H_2O)_p$ having at least one aldehyde or ketone group (reducing group), but also the hydrogenation products of these carbohydrates where the aldehyde or ketone group has been reduced to an alcohol. This term also encompasses the non-reducing sugars consisting of several carbohydrate units, of which the carbons bearing the hemiacetal hydroxyl are involved in the glycosidic bonds connecting the units together.

The carbohydrate component (component (a)) of the binding composition according to the invention may consist solely of hydrogenated sugars and be free of reducing or non-reducing sugars. This embodiment is advantageous since it leads to insulating products that are particularly sparingly colored.

The insulating products based on mineral wool obtained with a binding composition having a certain content of reducing sugars are relatively more colored, but may have a real economic advantage linked to the low cost of reducing sugars or of mixtures of incompletely hydrogenated sugars.

In the present invention, the term "hydrogenated sugar" means all of the products resulting from the reduction of a saccharide chosen from monosaccharides, disaccharides, oligosaccharides and polysaccharides and mixtures of these products.

The hydrogenated sugar is preferably a hydrogenation product of a is starch hydrolyzate.

Starch hydrolyzates are products obtained by enzymatic and/or acid hydrolysis of starch. The degree of hydrolysis is generally characterized by the dextrose equivalent (DE), defined by the following relationship:

$$DE = 100 \times \left( \frac{\text{number of broken glycosidic bonds}}{\text{number of glycosidic bonds in the initial starch}} \right)$$

The preferred starch hydrolyzates have, before the hydrogenation step, a DE of between 5 and 99 and advantageously between 10 and 80.

The hydrogenation of the saccharide may be performed via the known methods working under high hydrogen pressure and high temperature conditions, in the presence of a catalyst chosen from elements from groups IB, IIB, IVB, VI, VII and VIII of the Periodic Table of the Elements, preferably from the group comprising nickel, platinum, palladium, cobalt and molybdenum, and mixtures thereof. The preferred catalyst is Raney nickel. The hydrogenation converts the sugar or the mixture of sugars (starch hydrolyzate) into polyols or sugar alcohols.

Examples of hydrogenated sugars that may be mentioned include erythritol, arabitol, xylitol, sorbitol, mannitol, iditol, maltitol, isomaltitol, lactitol, cellobitol, palatinitol, maltotritol and the hydrogenation products of starch hydrolyzates. The hydrogenation products of starch hydrolyzates will preferably be used.

Preferably, the hydrogenated sugar or the mixture of hydrogenated sugars consists predominantly, i.e. at more than 50% by weight, of maltitol (hydrogenation product of maltose, a glucose dimer resulting from the enzymatic hydrolysis of starch).

The carbohydrate component (component (a)) may consist solely of reducing sugars. However, for the reasons indicated above, it preferably contains a significant fraction of hydrogenated sugars. The proportion of hydrogenated sugars in the carbohydrate is advantageously between 25% is and 100% by weight, and component (a) then contains up to 75% by weight of one or more reducing or non-reducing sugars, in addition to the hydrogenated sugar(s).

The content of hydrogenated sugars in the carbohydrate (component (a)) is preferably at least equal to 30% by weight, in particular at least equal to 50% by weight and ideally at least equal to 70% by weight.

The reducing sugars encompass monosaccharides and polysaccharides (disaccharides, oligosaccharides and polysaccharides).

Examples of monosaccharides that may be mentioned include those comprising from 3 to 8 carbon atoms, preferably aldoses and advantageously aldoses containing 5 to 7 carbon atoms. The aldoses that are particularly preferred are natural aldoses (belonging to the D series), in particular hexoses such as glucose, mannose and galactose.

Lactose or maltose are examples of disaccharides that may be used as reducing sugar.

The polysaccharides that can be used for the present invention preferably have a weight-average molar mass of less than 100 000, preferably less than 50 000 and advantageously less than 10 000.

Preferably, the polysaccharide contains at least one unit chosen from the abovementioned aldoses, advantageously glucose. Reducing polysaccharides consisting predominantly (at more than 50% by weight) of glucose units are particularly preferred.

The reducing sugar may in particular be a mixture of monosaccharides, oligosaccharides and polysaccharides, in particular a dextrin.

Dextrins are compounds corresponding to the general formula $(C_6H_{10}O_5)_n$. They are obtained by partial hydrolysis of starch. Their dextrose equivalent (DE) is advantageously between 5 and 99 and preferably between 10 and 80.

The non-reducing sugar is preferably a non-reducing oligoholoside containing not more than ten carbohydrate units.

As examples of such non-reducing sugars, mention may be made of diholosides such as trehalose, isotrehaloses, sucrose and isosucroses, triholosides such as melezitose, gentianose, raffinose, erlose and umbelliferose, tetraholosides such as stachyose, and pentaholosides such as verbascose.

Sucrose and trehalose are preferred, and better still sucrose.

Component (a), namely the carbohydrate consisting of hydrogenated sugars and/or reducing and/or non-reducing sugars, advantageously represents from 30% to 70% by weight and preferably from 40% to 60% by weight of solids of the binding composition. These values are understood before the addition of the anti-dusting emulsion.

The crosslinking agent used in the present invention is preferably selected from polycarboxylic acids, salts and anhydrides of polycarboxylic acids, metal salts of mineral acids and the amine and ammonium salts of mineral acids.

The mineral acids are for example sulfuric acid, phosphoric acid, nitric acid and hydrochloric acid. The metal salts may be salts of alkali metals, alkaline-earth metals and transition metals.

The mineral acids and their salts that can be used as crosslinking agent in the present invention are described for example in applications WO2012/168619, WO2012/168621 and WO2012/072938.

In one preferred embodiment, the crosslinking agent comprises a polycarboxylic acid or is a polycarboxylic acid. The polycarboxylic acid may be a polymeric acid (i.e. obtained by polymerization of carboxylated monomers) or a monomeric acid.

In order to limit the viscosity of the binding composition, this polycarboxylic acid advantageously has a number-average molar mass of less than or equal to 50 000, preferably less than or equal to 10 000 and advantageously less than or equal to 5000.

Mention may be made, as examples of polymeric polycarboxylic acids, of the homopolymers and copolymers obtained from monomers bearing at least one carboxylic acid groups such as (meth)acrylic acid, crotonic acid, iso-crotonic acid, maleic acid, cinnamic acid, 2-methylmaleic acid, fumaric acid, itaconic acid, 2-methylitaconic acid, α,β-methyleneglutaric acid and unsaturated dicarboxylic acid monoesters, such as $C_1$-$C_{10}$ alkyl maleates and fumarates. The copolymers may further contain one or more vinyl or acrylic monomers such as vinyl acetate, styrene, which is unsubstituted or substituted with alkyl, hydroxyl or sulfonyl groups, or with a halogen atom, (meth)acrylonitrile, (meth)acrylamide, $C_1$-$C_{10}$ alkyl (meth)acrylates, in particular methyl (meth)acrylate, ethyl (meth)acrylate, n-butyl (meth)acrylate and isobutyl (meth)acrylate.

In one particularly preferred embodiment, component (b) is or comprises a monomeric polycarboxylic acid. A monomeric polycarboxylic acid is a polycarboxylic acid that does not result from the polymerization of carboxylated monomers. A monomeric polycarboxylic acid does not therefore comprise a chain of repeating units.

It may be a dicarboxylic, tricarboxylic or tetracarboxylic acid.

The dicarboxylic acids encompass, for example, oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, in particular containing at least one boron or chlorine atom, tetrahydrophthalic acid and derivatives thereof, in particular containing at least one chlorine atom, such as chlorendic acid, isophthalic acid, terephthalic acid, mesaconic acid and citraconic acid.

The tricarboxylic acids encompass, for example, citric acid, tricarballylic acid, 1,2,4-butanetricarboxylic acid, aconitic acid, hemimellitic acid, trimellitic acid and trimesic acid.

Examples of tetracarboxylic acids that may be mentioned include 1,2,3,4-butanetetracarboxylic acid and pyromellitic acid.

Citric acid will preferably be used.

Component (b) advantageously represents from 30% to 70% by weight and preferably from 40% to 60% by weight of solids of the binding composition of the present invention. These values are understood before the addition of the anti-dusting emulsion.

The weight ratio of component (a) to component (b) is preferably between 70/30 and 30/70 and in particular between 60/40 and 40/60.

The binding composition further preferably comprises an esterification catalyst which may be selected, for example, from Lewis acids and bases, such as clays, colloidal or non-colloidal silica, metal oxides, urea sulfates, urea chlorides and silicate-based catalysts.

The catalyst may also be a compound containing phosphorus, for example an alkali metal hypophosphite, an alkali metal phosphite, an alkali metal polyphosphate, an alkali metal hydrogen phosphate, a phosphoric acid or an alkylphosphonic acid. Preferably, the alkali metal is sodium or potassium.

The catalyst may also be a compound containing fluorine and boron, for example tetrafluoroboric acid or a salt of this acid, in particular an alkali metal tetrafluoroborate such as sodium or potassium tetrafluoroborate, an alkaline-earth metal tetrafluoroborate such as calcium or magnesium tetrafluoroborate, a zinc tetrafluoroborate and an ammonium tetrafluoroborate.

Preferably, the catalyst is sodium hypophosphite, sodium phosphite or a mixture of these compounds.

The amount of catalyst introduced into the binding composition generally represents at most 20% by weight, advantageously from 1% to 10% by weight, relative to the total weight of components (a) and (b).

The binding composition in accordance with the invention may further comprise the conventional additives below in the following proportions calculated on the basis of 100 parts by weight of components (a)+(b):

from 0 to 2 parts of silane, in particular an aminosilane,
from 0.1 to 3 parts by weight of polyorganosiloxane, preferably polydimethylsiloxane (PDMS),
from 0 to 20 parts of a polyol different from the hydrogenated sugars,
from 0 to 30 parts, preferably 0 to 20 parts, of urea,
from 0 to 30 parts of an extending filler (extender) selected from derivatives of lignin such as ammonium lignosulfonate (LSA) or sodium lignosulfonate, and animal or plant proteins.

The role of these additives is known and is briefly recalled:

The silane is a coupling agent capable of reacting both with the surface of the fibers and with the components of the binder.

The polyorganosiloxane is preferably a polydiorganosiloxane bearing functions capable of reacting with the constituents (a) or (b) of the binding composition and/or with the silanol groups of the surface of the glass. These functions are for example silanol, carboxyl, anhydride, amine, epoxy or vinyl functions, in particular silanol and carboxyl functions.

The role of this polyorganosiloxane is to reduce the hydrophilic nature of the cured binder and of the final product obtained.

The reactive silicone is preferably liquid at ambient temperature. Its average molar mass is generally less than or equal to 50 000, preferably less than or equal to 10 000.

Preferably, the reactive silicone comprises a reactive function, advantageously a silanol function, at each of its chain ends.

The reactive function of the reactive silicone may be blocked by a protective group which releases said reactive function under the effect of heat. The proportion of reactive silicone in the binding composition generally varies from 0.1 to 3 parts, preferably from 0.3 to 2.5 parts, advantageously from 0.5 to 2.0 parts and better still from 0.7 to 1.8 parts by weight, per 100 parts by weight of the sum of the components (a) and (b).

The binding composition is prepared by simple mixing of the aforementioned constituents with water.

In the process of the present invention, the anti-dusting additive, i.e. the oil-in-water emulsion, is added to the binding composition preferably immediately before the application thereof on the mineral wool fibers. The application of the binding composition on the mineral fibers is preferably carried out by means of a spraying ring comprising a plurality of nozzles.

In one embodiment, the oil-in-water emulsion is added to the tank of the binding composition and the mixture obtained may be mixed by a conventional mixing system until there is a uniform distribution of the oil droplets in the composition to be sprayed.

In another embodiment, the stable oil-in-water emulsion is introduced into the binding composition by injecting a flow of oil-in-water emulsion into the flow of binding composition feeding the spraying ring. The mixing of the two liquid compositions is then carried out by means of the turbulent flow of the mixture in the lines of the equipment.

In this second embodiment, the introduction of the oil-in-water emulsion into the binding composition will be carried out at most several tens of seconds before the spraying of the mixture through the nozzles of the spraying ring.

The dilution that the anti-dusting emulsion undergoes when it is introduced into the binding composition is between around 1/10 and 1/500, in particular between 1/20 and 1/200.

The binding composition containing the anti-dusting emulsion is preferably applied on the mineral fibers in an amount such that the final content of organic binder, after evaporation of the solvent phase and curing in the drying oven, is between around 3% and 7%, in particular between 3.5% and 6.5% and particularly preferably between 4% and 6% by weight, relative to the weight of the mineral fibers.

The amount of mineral oil applied on the mineral wool fibers and present in the final product is between 0.1% and 2.0%, preferably between 0.2% and 1.0%, in particular between 0.3% and 0.8%, relative to the weight of the mineral fibers.

EXAMPLE

1) Preparation of the Binding Composition (Base Binder)

Binding compositions comprising 48 parts by weight of Maltilite® 5575 (maltitol syrup), 52 parts by weight of citric acid and 5 parts by weight of sodium hypophosphite are prepared.

The binding composition is prepared by introducing, into a container, water (around 80% of the final composition), hydrogenated sugar (maltitol syrup), citric acid and sodium hypophosphite (catalyst).

2) Preparation of a Stable Anti-Dusting Oil-in-Water Emulsion According to the Invention 150 g of Pluronic F-127 (triblock copolymer of propylene oxide and ethylene oxide) and 65 g of Rhodopol 23 (xanthan gum) are dissolved in 10 liters of water by heating to a temperature of around 50° C. and by stirring for around 20 hours until the surfactant and the thickener are completely dissolved. Added next to 4.8 kg of this aqueous solution are 5.5 liters of a mineral oil having a kinematic viscosity at 20° C. of 2300 mm$^2$/s (ISO 3104), a kinematic viscosity at 40° C. of 500 mm$^2$/s (ISO 3104) and a flash point of 300° C. (ISO 2592). Next the Ultra-Turrax® T50 disperser equipped with an S50N-G45G dispersing tool is introduced into the mixture, then the Ultra-Turrax is operated at a speed of 10 000 rpm for 2 min.

The mean diameter of the oil droplets of the emulsion obtained is 16 μm. This diameter does not vary after storing the emulsion for 1 week at ambient temperature.

3) Comparative Oil-In-Water Emulsion

The HydroWax® 88 emulsion sold by SASOL is used as comparative anti-dusting emulsion. This emulsion contains around 52-53% by weight of a high-viscosity mineral oil having a kinematic viscosity at 40° C. of 500 mm$^2$/s and a flash point of greater than 280° C. According to information provided by the manufacturer, this emulsion is stabilized by anionic surfactants. The mean diameter of the oil droplets, determined by laser diffraction particle size analysis on a Metasizer 2000 device is 1.8 μm.

4) Manufacture of the Mineral Wool Blanket

Glass wool is manufactured by the internal centrifugation technique in which the molten glass composition is converted into fibers by means of a tool known as a "centrifugation spinner", comprising a basket forming a chamber for receiving the molten composition and a peripheral band pierced by a multitude of holes: the spinner is rotated about its vertical axis of symmetry, the composition is expelled through the holes under the effect of the centrifugal force and the material escaping from the holes is attenuated into fibers with the help of an attenuating gas flow.

Conventionally, a binding composition spraying ring is placed beneath the fiberizing spinner so as to distribute the binding composition uniformly on the glass wool that has just been formed. The binding composition is mixed with each of the anti-dusting oil-in-water emulsions (according to the invention and comparative) by means of a static mixer.

The mineral wool thus bound is collected on a belt conveyor provided with internal suction boxes that retain the mineral wool in the form of a felt or web on the surface of the conveyor. The conveyor then runs into a drying oven maintained at 270° C., where the constituents of the binding composition polymerize to form a binder. The insulating product obtained has a nominal density equal to 17.5 kg/m$^3$, a nominal thickness of around 75 mm and a loss on ignition of the order of 5%.

5) Evaluation of the Anti-Dusting Effectiveness

The anti-dusting effectiveness of the oil-in-water emulsions according to the invention is evaluated with the aid of an internal device. A 20 cm×30 cm sample of glass wool is fastened in a frame so that at least one of its main faces is free. A perforated is plate having dimensions slightly smaller than those of the sample, fastened to an articulated arm, hits the free face of the sample. An optical device counts the number of particles released.

6) Results

TABLE 1

| Number of dust particles detected | | | |
| --- | --- | --- | --- |
| Amount of mineral oil relative to the fibers (%) | Hydrowax ® 88 comparative | Emulsion according to the invention | Reduction in the number of dust particles |
| 0.2 | 380 | 140 | 63% |
| 0.4 | 227* | 100 | 56% |
| 0.7 | 190 | 110 | 42% |

*Mean value calculated from three different productions, carried out over the same day (290 (start of day)-180 (middle of day)-210 (end of day); all the other values correspond to a single production of mineral wool Table 1 above shows the number of dust particles detected for samples of glass wool bound with the same binding composition based on maltitol and on citric acid and containing identical amounts of high-viscosity mineral oil.

These results show that, for the same amount of oil (respectively equal to 0.2%, 0.4% and 0.7% by weight relative to the weight of mineral fibers), the emulsion according to the invention containing droplets having a mean diameter of 16 μm more effectively reduces the number of particles than a composition according to the prior art (HydroWax® 88) containing particles having a mean diameter of 1.8 μm.

TABLE 2

| Amount of reactive silicone oil relative to the fibers (%) | Hydrowax ® 88 comparative | Emulsion according to the invention | Reduction |
|---|---|---|---|
| 0.045 | 520 | 220 | 58% |
| 0.1 | 450 | 190 | 58% |

The results of table 2 above were obtained under conditions identical to those of line 2 of table 1 (0.4% of mineral oil added in the form of oil-in-water emulsion), with the only difference being that a reactive silicone oil (SILRES® BS 5137, sold by Wacker) was added to the binding composition. This silicone makes the binder and the final product more hydrophobic.

It is observed that the amount of dust is overall greater than in the absence of silicone oil. The reduction in the number of dust particles by the emulsion in comparison with the oil according to the prior art is however as spectacular as in the absence of silicone.

The invention claimed is:

1. A process for manufacturing an insulating product based on mineral wool, the process comprising:
    applying, on mineral wool fibers, a binding composition comprising
        (a) at least one carbohydrate selected from a reducing sugar, a non-reducing sugar, a hydrogenated sugar, and a mixture thereof, and
        (b) at least one crosslinking agent for crosslinking the carbohydrate(s);
    evaporating a solvent phase of the binding composition; and
    thermally curing a non-volatile fraction of the binding composition,
    wherein an oil-in-water emulsion comprising water, a mineral oil, at least one nonionic surfactant, and a water-soluble polysaccharide are added to the binding composition,
    wherein a total amount of the nonionic surfactant in the oil-in-water emulsion is from 0.5 to 5.0 parts by weight per 100 parts by weight of the mineral oil,
    wherein a total amount of the water-soluble polysaccharide in the oil-in-water emulsion is from 0.1 to 2.0 parts by weight per 100 parts by weight of the mineral oil, and
    wherein a mean diameter of oil droplets of the oil-in-water emulsion, determined by laser diffraction particle size analysis, is greater than 5 μm.

2. The process as claimed in claim 1, wherein the crosslinking agent is at least one selected from the group consisting of a polycarboxylic acid, a polycarboxylic salt, an anhydride of a polycarboxylic acid, a metal salt of a mineral acid, an amine salt of a mineral acid, and an ammonium salt of a mineral acid.

3. The process as claimed in claim 2, wherein the crosslinking agent comprises a polycarboxylic acid.

4. The process as claimed in claim 1, wherein the carbohydrate comprises a hydrogenated sugar, and a proportion of hydrogenated sugars in the carbohydrate is between 25% and 100% by weight.

5. The process as claimed in claim 1, wherein the binding composition further comprises from 0.1 to 3 parts by weight of polyorganosiloxane relative to 100 parts by weight of constituents (a)+(b).

6. The process as claimed in claim 5, wherein the polyorganosiloxane bears functions capable of reacting with the constituents (a) or (b) of the binding composition.

7. The process as claimed in claim 1, wherein the mineral oil has a kinematic viscosity at 20° C. between 100 and 6000 mm$^2$/s.

8. The process as claimed in claim 1, wherein the mean diameter of the mineral oil droplets is between 5.1 μm and 150 μm.

9. The process as claimed in claim 1, wherein the total amount of the water-soluble polysaccharide in the oil-in-water emulsion is from 0.5 to 1 part by weight per 100 parts by weight of mineral oil.

10. The process as claimed in claim 1, wherein the total amount of the nonionic surfactant in the oil-in-water emulsion is from 1.2 to 3 parts by weight per 100 parts by weight of mineral oil.

11. The process as claimed in claim 1, wherein the application of the binding composition on the mineral fibers is carried out by means of a spraying ring comprising a plurality of nozzles, and
    wherein the oil-in-water emulsion is introduced into the binding composition by injecting a flow of oil-in-water emulsion into the flow of binding composition feeding the spraying ring.

12. The process as claimed in claim 1, wherein the oil-in-water emulsion is added to a tank comprising the binding composition, to obtain a mixture, and the mixture is mixed until there is a uniform distribution of the oil droplets.

13. The process as claimed in claim 1, wherein a total amount of mineral oil applied on the mineral wool fibers is between 0.1 and 2.0% relative to the weight of the mineral fibers.

14. The process as claimed in claim 1, wherein the hydrogenated sugar is selected from the group consisting of a hydrogenation product of a monosaccharide, a hydrogenation product of a disaccharide, a hydrogenation product of an oligosaccharide, a hydrogenation product of a polysaccharide, and mixtures thereof.

15. The process as claimed in claim 1, wherein the carbohydrate comprises a hydrogenated sugar, and the hydrogenated sugar is a hydrogenation product of a starch hydrolyzate.

16. The process as claimed in claim 1, wherein the oil-in-water emulsion is added to the binding composition immediately before the application thereof on the mineral wool fibers.

17. The process as claimed in claim 3, wherein the polycarboxylic acid is a monomeric polycarboxylic acid.

18. The process as claimed in claim 4, wherein the proportion of hydrogenated sugars in the carbohydrate is at least 70% by weight.

19. The process as claimed in claim 5, wherein the polyorganosiloxane is polydimethylsiloxane.

20. The process as claimed in claim 7, wherein the mineral oil has a kinematic viscosity at 20° C. between 1000 and 5000 mm$^2$/s.

* * * * *